Jan. 7, 1936.   J. N. SMITH   2,026,852
SPOUT ATTACHMENT FOR VESSELS
Filed July 29, 1932   2 Sheets-Sheet 1

INVENTOR
James N. Smith.
By Donald W. Robertson
ATTORNEY

Jan. 7, 1936. J. N. SMITH 2,026,852
SPOUT ATTACHMENT FOR VESSELS
Filed July 29, 1932 2 Sheets-Sheet 2
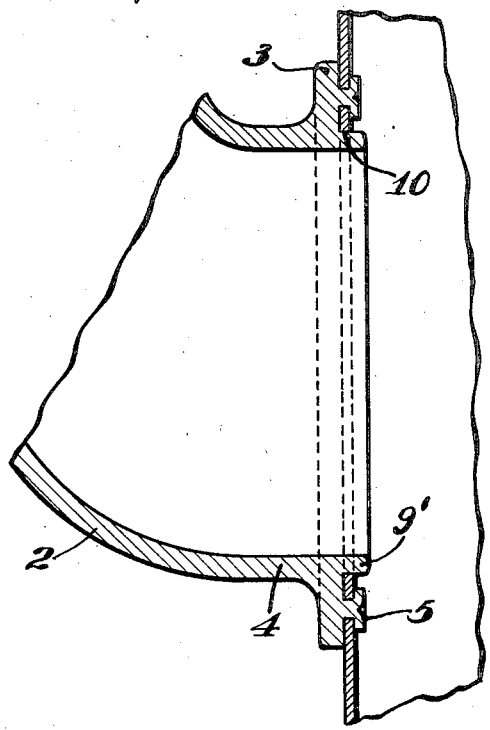
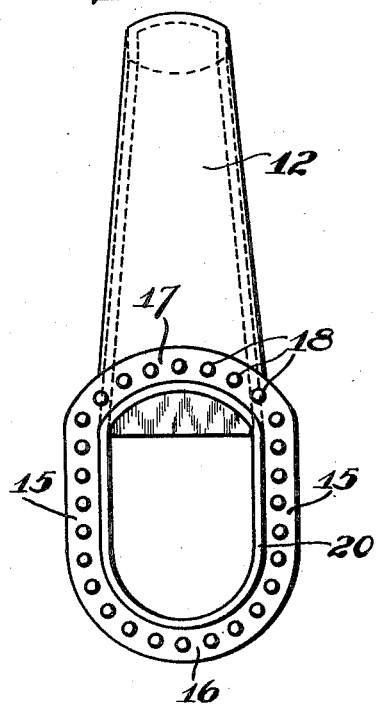
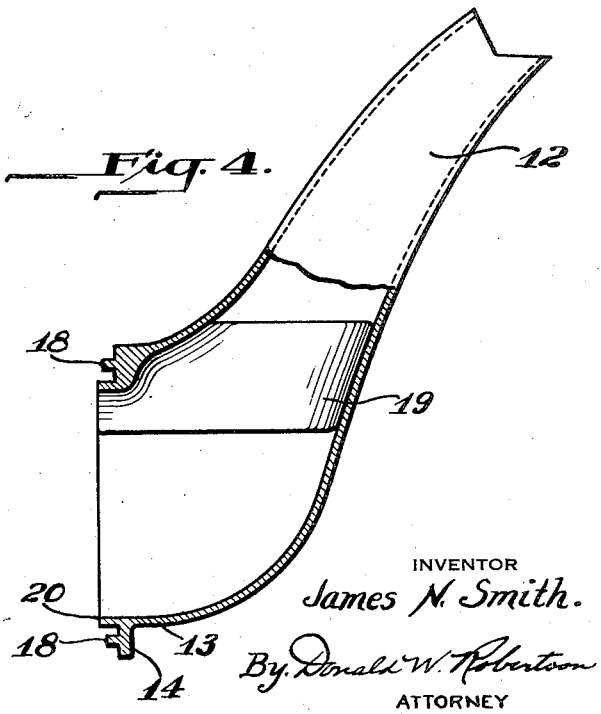
INVENTOR
James N. Smith.
By Donald W. Robertson
ATTORNEY Patented Jan. 7, 1936

2,026,852

UNITED STATES PATENT OFFICE 2,026,852

SPOUT ATTACHMENT FOR VESSELS

James N. Smith, Westfield, N. J., assignor, by mesne assignments, to The Enterprise Aluminum Company, a corporation of Ohio Application July 29, 1932, Serial No. 626,056

3 Claims. (Cl. 53—9)

The invention relates to spouted vessels such as teakettles and pots, coffee pots and the like, and is principally directed toward improvements in the spout and means of attaching the same.

The development of the cooking utensil art has in recent times been characterized by a growing tendency toward the production of vessels which are lighter in weight and easier to handle. This tendecy has been given impetus by continued efforts to reduce the cost of manufacture which has made the use of thin-gauge utensils a commercial necessity. The adoption of vessels with thinner walls has greatly increased the problem of attaching the spouts of teakettles and similar vessels, and the means of attachment which have been employed heretofore have not been found satisfactory for the vessels of light construction which are now being manufactured. The problem has been to design a method and means of attachment which would not only lend itself to the requirements of light-gauge utensils but which at the same time would result in an attachment comparable in strength and serviceability with that of the heavier gauge utensils previously employed.

Accordingly it is an object of my invention to provide a spout and means of attachment which overcomes the difficulties suggested above and which is particularly adapted to the manufacturing requirements of light-gauge utensils. It is a further object to provide a spout which is simple in design, easy to manufacture and which may be easily attached to the vessel.

A particular object of the present invention is the provision of a spout attachment which has a strengthened attaching flange, the strengthening means employed serving not only to support the attaching flange of the spout but also to support the walls of the vessel at the point of attachment.

Figure 1:
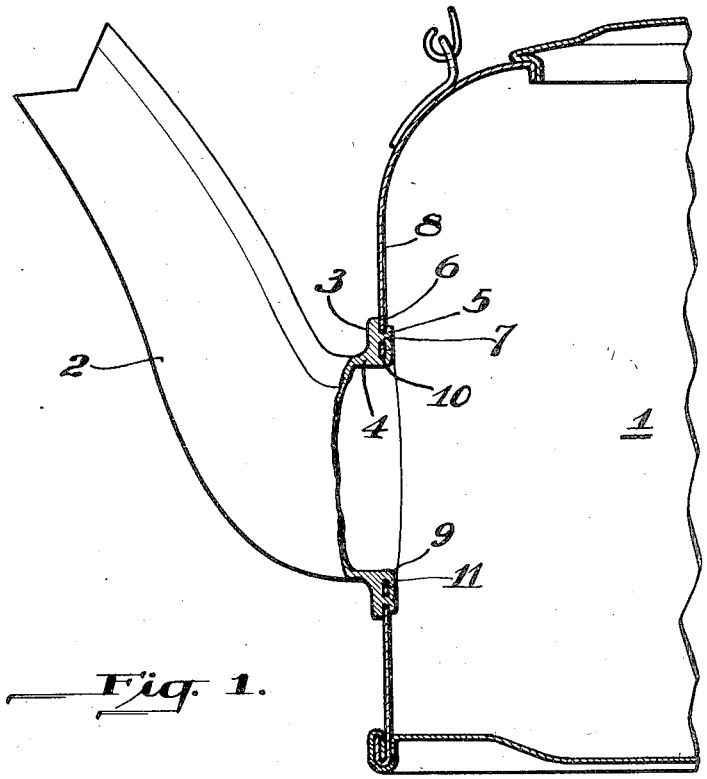
Figure 2:
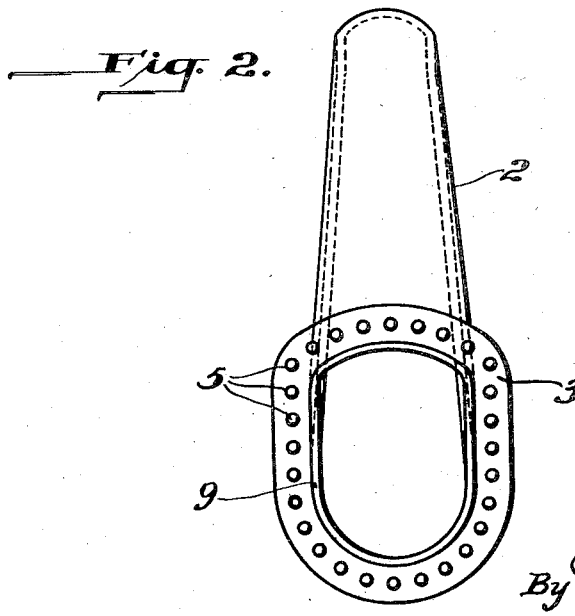

Other objects and advantages will appear in connection with a description of the drawings in which Fig. 1 is a view illustrating a preferred embodiment of my invention, the vessel and a portion of the spout being shown in central vertical section. Fig. 2 is an elevational view of the spout prior to its attachment to the vessel, viewed from the inner end. Fig. 3 is a fragmentary central vertical sectional view to an enlarged scale, showing a modification of the attachment illustrated in Fig. 1.

Fig. 4 is a view showing another embodiment of the invention, the attaching portion of the spout being in central longitudinal section; and Fig. 5 is an elevation of the spout shown in Fig. 4, viewed from the inner or attaching end thereof.

In Fig. 1 my improved spout is shown as attached to a teakettle, indicated generally by the reference numeral 1. The spout 2 is provided at its inner end with a peripheral attaching flange 3 extending outwardly around the top, sides and bottom of the base portion 4 thereof. The flange 3 is provided with a plurality of rivet studs 5 projecting from the vessel-contacting face 6 thereof and extending through apertures 7 formed in the side wall 8 of the vessel. The rivet studs 5 are preferably formed integrally with the attaching flange 3.

The spout 2 is provided with a second attaching flange 9 which is arranged at right angles to the attaching flange 3 and extends through an opening 10 in the wall 8 of the vessel. When the spout has been attached to the vessel as shown in Fig. 1, the rivet studs 5 are headed or pressed outwardly around the edges of the apertures 7 and the attaching flange 9 may, if desired, likewise be pressed outwardly around the edges of the opening 10 as at 11. In the modification shown in Fig. 3 the attaching flange 9' is not pressed outwardly around the edges of the opening 10 but is left projecting inwardly in the finished article. The edge of the flange 9' is smoothly rounded. It will be seen that the attaching flange 9 or 9', in addition to stiffening the outwardly-extending attaching flange 3, provides a joint which is smooth on the inside and which overlies and conceals the edges of the aperture 10. This is of advantage in cleaning the vessel because the flange protects the fingers of the user from the sharp edge of this aperture. This advantage is particularly apparent when the attaching flange is turned over and pressed into tight engagement with the inside of the wall 8 of the vessel, as at 11 in Fig. 1.

I prefer to make the flange 9 of such a height that its top will lie in a plane which is above the plane of the ends of the rivet studs 5. This is of advantage when the spout is made in the form of a casting in that the sharp edge of the parting seam made by removal of the core used to form the inside contour of the spout can be more easily and thoroughly removed, since it is on the exposed portion of the flange 9 and above the plane of the ends of the rivet studs 5.

In the form of the invention illustrated in Figs. 4 and 5 the essential features of construction remain the same but the outwardly-extending attaching flange is modified so as to extend outwardly around only three sides of the attaching portion of the spout, extending inwardly across the top of the attaching portion for a purpose which will hereinafter appear.

The spout, which is indicated generally by the reference numeral 12, has an annular attaching portion or base portion 13 provided with an attaching flange 14. Attaching flange 14 extends outwardly around the sides 15 and bottom 16 of the base portion 13, but inwardly across the top 17 of the base portion. The object of this construction is to provide an attaching flange which extends unbroken around the entire periphery of the base portion of the spout but which at the same time does not interfere with the molding of the spout. When made as a die casting or other casting, this construction is of advantage from the standpoint of ease of molding because of the elimination of a pocket or reverse angle between the top surface of portion 17 of the flange and the outwardly and upwardly-curving portion of the spout. This pocket or reverse angle can be seen in Fig. 1 and a comparison of this view with Fig. 4 will indicate clearly the advantage, from the standpoint of ease of molding, of the form of the invention therein illustrated. This construction still permits the provision of an unbroken series of attaching rivet studs 18 entirely surrounding the attaching portion of the spout.

In order to effect the attachment of the form of spout illustrated in Figs. 4 and 5 it is necessary, or at least desirable, to provide an anvil 19 for insertion at the inner end of the spout during the rivet-heading and flanging operation. After the anvil 19 is in place the spout is inserted in the attaching opening of the vessel, the flange 20 extending through this opening and the rivet studs 18 extending through the apertures surrounding such opening. The vessel with the spout in place is then positioned on the horn or other jig or fixture of the press which is to be used for the flanging and riveting operation and pressure applied along the external flanged portions 15 and 16 as well as to the body of the spout where it is supported by the anvil 19. This pressure is transmitted to the ends of the rivets, and the supporting horn (or equivalent fixture) simultaneously forms the rivet heads and forms the flange 20 outwardly around the edges of the attaching opening in the wall of the vessel and into tight-pressed engagement with the inner surface of the wall, forming a rigid and leak-proof joint. The flange 20 may, if desired, be left projecting inwardly as in the case of the flange 9' in Fig. 3.

The spout shown in Figs. 2 and 3 may be attached in a similar manner except that the use of a supporting anvil inside of the end of the spout is unnecessary, pressure being applied around the entire outer surface of the attaching flange 3.

By my invention I have provided a spout which can be attached to a vessel by a single power press operation which simultaneously rivets the spout to the wall of the vessel and forms a protecting flange around the edges of the pouring opening of the vessel, producing a leak-proof joint and an extremely rigid attachment which is particularly adapted to the manufacture of spouted vessels having walls of thin gauge metal. In the interest of clarity I have described my invention with reference to particular embodiments and have employed specific language. In the use of such language I have no intention of excluding any equivalents or minor variations of the invention set forth.

I claim:

1. In a teakettle or similar vessel, a spout having a peripheral attaching flange extending outwardly around the sides and bottom of the base portion thereof and inwardly across the top of said base portion, said outwardly and inwardly extending portions of said flange both provided with means for attaching the spout to the vessel.

2. In a teakettle or similar vessel, a spout having an annular attaching portion provided with a peripheral flange extending in part inwardly and in part outwardly from the outer wall of said annular attaching portion, said peripheral flange provided with integral attaching means associated with both the inwardly and outwardly extending parts thereof.

3. A vessel having wall portions of uniform thin gauge metal, a spout therefor having a peripheral attaching flange provided with a plurality of rivet studs and a second attaching flange, said rivet studs and said second attaching flange extending through apertures in said thin wall portions of said vessel, said rivet studs headed and said second attaching flange turned outwardly around the periphery of the opening through which it extends to lock the spout to the vessel, said outwardly-turned portion of the second attaching flange extending flush with the headed studs to provide a smooth unitary construction.

JAMES N. SMITH.